United States Patent [19]

Schmitter

[11] Patent Number: 5,763,512

[45] Date of Patent: Jun. 9, 1998

[54] STABILIZATION OF POLYAMIDE, POLYESTER AND POLYKETONE

[75] Inventor: André Schmitter, Hegenheim, France

[73] Assignee: Ciba Specialty Chemicals Corporation, Tarrytown, N.Y.

[21] Appl. No.: 823,264

[22] Filed: Mar. 24, 1997

[51] Int. Cl.[6] ................................................. C08K 5/49
[52] U.S. Cl. ................................................. 524/119; 558/78
[58] Field of Search ................................... 524/119; 558/78

[56] References Cited

U.S. PATENT DOCUMENTS

| | | | |
|---|---|---|---|
| 3,960,928 | 6/1976 | Mauz | 528/76 |
| 4,318,845 | 3/1982 | Spivack et al. | 524/91 |
| 4,360,617 | 11/1982 | Müller et al. | 524/101 |
| 4,374,219 | 2/1983 | Spivack et al. | 524/91 |
| 5,276,076 | 1/1994 | Pastor et al. | 524/119 |
| 5,331,031 | 7/1994 | Pastor et al. | 524/119 |
| 5,334,739 | 8/1994 | Pastor et al. | 558/78 |
| 5,344,860 | 9/1994 | Pastor et al. | 524/119 |
| 5,405,893 | 4/1995 | Pastor et al. | 524/119 |
| 5,486,641 | 1/1996 | Shum et al. | 558/78 |
| 5,512,621 | 4/1996 | Pastor et al. | 524/119 |
| 5,650,464 | 7/1997 | Brunner et al. | 524/700 |

FOREIGN PATENT DOCUMENTS

| | | |
|---|---|---|
| 0222454 | 5/1987 | European Pat. Off. . |
| 0685517 | 12/1995 | European Pat. Off. . |

*Primary Examiner*—Terressa Mosley
*Attorney, Agent, or Firm*—Luther A. R. Hall

[57] ABSTRACT

This invention relates to compositions comprising a polyamide, polyester or polyketone, a specific organic phosphite (Irgafos®12, Ciba-Geigy) and a sterically hindered phenol such as Irganox®1098, Irganox®1076, Irganox®1010, Irganox®245, Irganox®259, Irganox®1035, Irganox®3114 or Irganox®3125 (Ciba-Geigy), to the use thereof for stabilising polyamide, polyester or polyketone against oxidative, thermal and/or light-induced degradation, as well as to a process for stabilising these plastic materials.

11 Claims, No Drawings

STABILIZATION OF POLYAMIDE, POLYESTER AND POLYKETONE

The present invention relates to compositions comprising a polyamide, polyester or polyketone, a specific organic phosphite (Irgafos®12, Ciba-Geigy) and a sterically hindered phenol, to the use thereof for stabilising polyamide, polyester or polyketone against oxidative, thermal and/or light-induced degradation, as well as to a process for stabilising these plastic materials.

It is known from U.S. Pat. No. 4,360,617 that stabiliser mixtures comprising symmetrical tri-arylphosphites and specific phenolic antioxidants are particularly suitable for protecting specific organic materials, such as polyurethane, polyacrylonitrile, polyamide 12 or polystyrene, from oxidative, thermal or light-induced degradation. Tris(2,4-di-tert-butylphenyl)phosphite (Irgafos®168, Ciba-Geigy) is disclosed as the preferred triaryl phosphite.

In polyamides, polyesters and polyketones, these known stabiliser mixtures cannot meet all the demands made on them. It is known that such stabiliser mixtures reduce the starting colour as well as the colour development of the polyamide during oven ageing and that they reduce the decrease of the mechanical properties of the polyamide during oven ageing and exposure to light. A disadvantage of these stabiliser mixtures is that it is often found that these phosphites have a tendency to bloom.

U.S. Pat. Nos. 4,318,845 and 4,374,219 disclose alkanolamine esters of cyclic 1,1'-biphenyl-2,2'-diyl phosphites and alkylidene-1,1'-biphenyl-2,2'-diyl phosphites as stabilisers for organic polymers and lubricating oils, especially as processing stabilisers for polyolefins, elastomers, polyesters and polycarbonates.

It has now been found that a stabiliser mixture comprising a very specific phosphite, selected from the U.S. Pat. Nos. 4,318,845 and 4,374,219, together with a very specific group of sterically hindered phenols, is particularly suitable as stabiliser for polyamides, polyesters or polyketones. The polyamides, polyesters or polyketones thus stabilised have enhanced properties with respect to oxidative, thermal and/or light-induced degradation, and the novel phosphite does not bloom.

Accordingly, this invention relates to compositions, comprising a) a polyamide, polyester or polyketone which is subject to oxidative, thermal or light-induced degradation, b) the phosphite of formula I

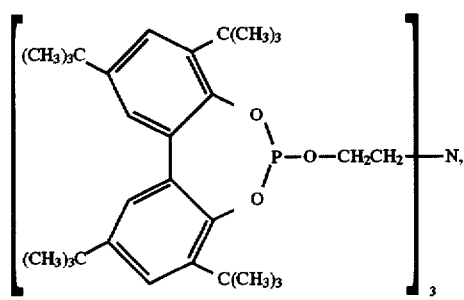

and c) at least one compound of formula II

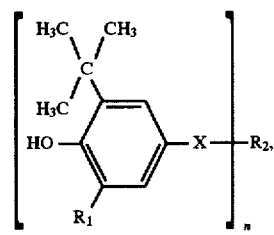

wherein $R_1$ is $C_1$–$C_4$alkyl, n is 1, 2, 3 or 4,

X is methylene,

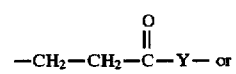

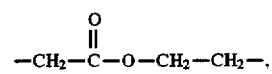

Y is oxygen or —NH—; and, if n=1,

X is

wherein Y is bound to $R_2$, and $R_2$ is $C_1$–$C_{25}$alkyl; and, if n=2,

X is

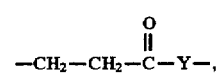

wherein Y is bound to $R_2$, and $R_2$ is $C_2$–$C_{12}$alkylene, $C_4$–$C_{12}$alkylene which is interrupted by oxygen or sulfur; or, if Y is —NH—, $R_2$ is additionally a direct bond; and, if n=3, X is methylene or

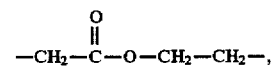

wherein the ethylene group is bound to $R_2$, and $R_2$ is

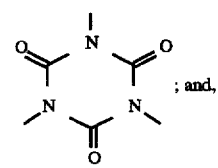

; and, and, if n=4,

X is $$-CH_2-CH_2-\overset{\overset{O}{\|}}{C}-Y-,$$

wherein Y is bound to $R_2$, and $R_2$ is $C_4$–$C_{10}$alkanetetrayl.

Alkyl of up to 25 carbon atoms is a branched or straight-chain radical, typically methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl or docosyl. Preferred meanings of $R_1$ are methyl and tert-butyl. $R_2$ is particularly preferably $C_1$–$C_{20}$alkyl, especially $C_1$–$C_{18}$alkyl, typically $C_4$–$C_{18}$alkyl. $R_2$ is particularly preferably $C_8$–$C_{18}$alkyl, especially $C_{14}$–$C_{18}$alkyl, typically $C_{18}$-alkyl.

$C_2$–$C_{12}$Alkylene is a branched or straight-chain radical, typically ethylene, propylene, tetramethylene, pentamethylene, hexamethylene, heptamethylene, octamethylene, decamethylene or dodecamethylene. $R_2$ is particularly preferably e.g. $C_2$–$C_{10}$alkylene, especially $C_2$–$C_8$-alkylene. $R_2$ is particularly preferably e.g. $C_4$–$C_8$alkylene, especially $C_4$–$C_6$-alkylene, typically hexamethylene.

$C_4$–$C_{12}$Alkylene which is interrupted by oxygen or sulfur can be interrupted once or several times and is typically
—CH$_2$—O—CH$_2$CH$_2$—O—CH$_2$—, —CH$_2$—(O—CH$_2$CH$_2$—)$_2$O—CH$_2$—, —CH$_2$—(O—CH$_2$CH$_2$)$_3$O—CH$_2$—, —CH$_2$—(O—CH$_2$CH$_2$—)$_4$O—CH$_2$—, —CH$_2$CH$_2$—O—CH$_2$CH$_2$—O—CH$_2$CH$_2$— or —CH$_2$CH$_2$—S—CH$_2$CH$_2$—. $R_2$ is particularly preferably e.g. $C_4$–$C_{10}$alkylene which is interrupted by oxygen or sulfur, especially $C_4$–$C_8$alkylene which is interrupted by oxygen or sulfur, typically $C_4$–$C_6$alkylene which is interrupted by oxygen or sulfur. $R_2$ is particularly preferably —CH$_2$CH$_2$—O—CH$_2$CH$_2$—O—CH$_2$CH$_2$— or —CH$_2$CH$_2$—S—CH$_2$CH$_2$—.

Alkanetetrayl of 4 to 10 carbon atoms is typically $$-CH_2-\underset{\underset{CH_2-}{|}}{\overset{\overset{CH_2-}{|}}{C}}-CH_2-$$

(pentaerythritol), $$-CH_2-\overset{|}{CH}-\overset{|}{CH}-CH_2-,$$

$$-CH_2-CH_2-\overset{|}{CH}-\overset{|}{CH}-CH_2-,$$

$$-CH_2-CH_2-\overset{|}{CH}-\overset{|}{CH}-CH_2-CH_2-,$$

$$-CH_2-CH_2-\overset{|}{CH}-CH_2-\overset{|}{CH}-CH_2-CH_2-\ \text{or}$$

$$-CH_2-CH_2-\overset{|}{CH}-CH_2-CH_2-\overset{|}{CH}-CH_2-CH_2-.$$

Pentaerythritol is preferred. Component (c) can also be mixtures of different sterically hindered phenols of formula II. Interesting compounds are those containing as component (c) at least one compound of formula II, wherein, if n=1, $R_2$ is $C_1$–$C_{20}$alkyl.

Preferred compositions are those containing as component (c) at least one compound of formula II, wherein, if n=2, $R_2$ is $C_2$–$C_8$alkylene, $C_4$–$C_8$alkylene which is interrupted by oxygen or sulfur; or, if Y is —NH—, $R_2$ is additionally a direct bond and, if n=4, $R_2$ is $C_4$–$C_8$alkanetetrayl.

Preferred compositions are also those containing as component (c) at least one compound of formula II, wherein, $R_1$ is methyl or tert-butyl, n is 1,2 or 4, X is $$-CH_2-CH_2-\overset{\overset{O}{\|}}{C}-Y-,$$

Y is oxygen or —NH—; and, if n=1, $R_2$ is $C_{14}$–$C_{18}$alkyl; and, if n=2, $R_2$ is $C_4$–$C_6$alkylene, or $C_4$–$C_6$alkylene which is interrupted by oxygen; and, if n=4, $R_2$ is $C_4$–$C_6$alkanetetrayl.

Interesting compositions are also those containing as component (c) at least one compound of formula I, wherein the compound of formula I is a compound of formula IIa to IIh (IIa)

$$\left[\begin{array}{c}H_3C\diagdown_C\diagup CH_3\\H_3C\diagup\phantom{C}\diagdown\\HO-\phantom{xx}-CH_2-CH_2-\overset{\overset{O}{\|}}{C}-NH-(CH_2)_3-\\H_3C\diagdown\phantom{C}\diagup\\H_3C\diagup^C\diagdown CH_3\end{array}\right]_2 ,\ \text{Irganox}^\circledR 1098$$

-continued
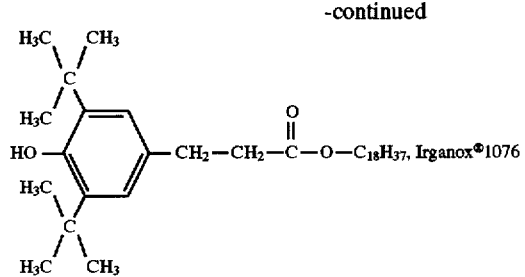 (IIb)
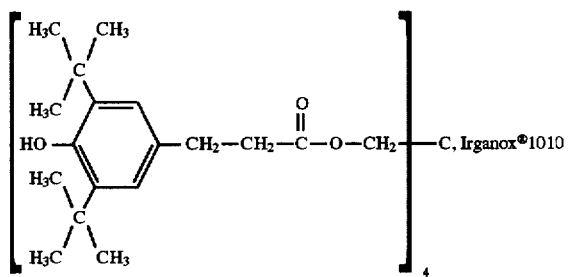 (IIc)
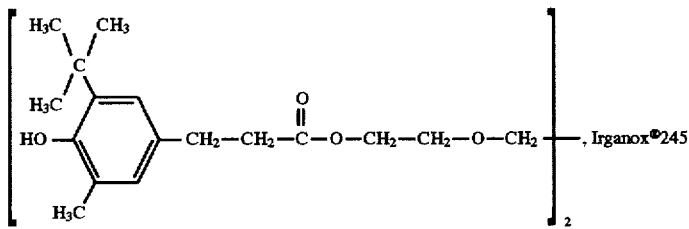 (IId)
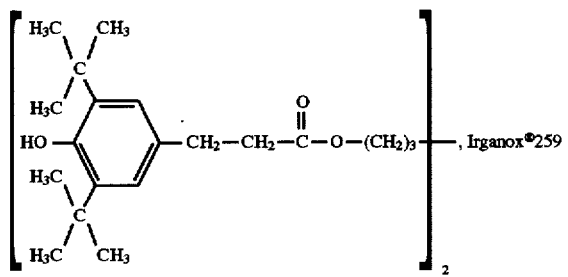 (IIe)
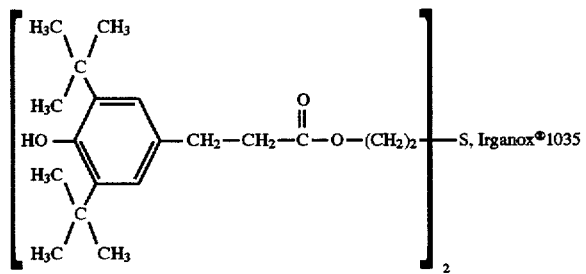 (IIf)
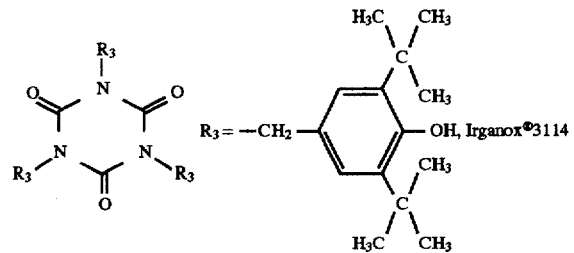 (IIg)

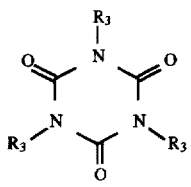
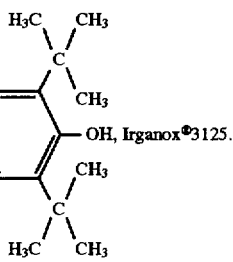 (IIh)

$R_3 = -(CH_2)_2-O-\overset{O}{\underset{\|}{C}}-CH_2-$ Irganox®3125.

Irganox®1098, Irganox®1076, Irganox®1010, Irganox®245, Irganox®259, Irganox®3114, Irganox®1035 and Irganox®3125 are trademarks of Ciba-Geigy.

Preferred compositions are those containing as component (c) at least one compound of formula I, wherein the compound der formula I is a compound of formula IIa, IIb, IIc or IId, in particular a compound of formula IIa, IIb or IIc, typically a compound of formula IIa.

Component (b) of the novel composition, or the phosphite of formula I, is known and its preparation is disclosed in Example 4 of U.S. Pat. Nos. 4,318,845 and 4,374,219 mentioned at the outset. This phosphite can be obtained in different modifications, as disclosed, inter alia, in the following U.S. patents. U.S. Pat. No. 5,276,076 discloses a solid amorphous form of the phosphite of formula I. U.S. Pat. No. 5,334,739 discloses the α-crystalline form of the phosphite of formula I. U.S. Pat. No. 5,326,802 discloses the β-crystalline form, and U.S. Pat. No. 5,321,031 discloses the γ-crystalline form, of the phosphite of formula I. The phosphite of formula I is commercially available under the trademark Irgafos®12 (Ciba-Geigy).

Component (c) of the novel composition, or the compounds of formula II, are known and some are commercially available. Possible processes for the preparation of the compounds of formula II may be found, inter alia, in U.S. Pat. Nos. 3,330,859 and 3,960,928.

Polyamides will be understood as meaning aliphatic and aromatic polyamides or copolyamides which are derived from diamines and dicarboxylic acids and/or from aminocarboxylic acids or their corresponding lactams. Suitable polyamides are, for example: PA 6, PA 11, PA 12, PA 46, PA 6,6, PA 6,9, PA 6,10 or PA 6,12, PA 10,12, PA 12,12 and also amorphous polyamides of the Trogamid PA 6-3-T and Grilamid TR 55 type. Polyamides of the cited type are commonly known and are commercially available.

Interesting compositions are those containing as component (a) polyamide 6, polyamide 6,6, polyamide 11 or polyamide 12 or copolymers thereof, in particular polyamide 6 or polyamide 6,6, or elastomer-modified polyamide 6 or polyamide 6,6 blended with polypropylene.

Polyesters may be homopolyesters or mixed polyesters which are composed of aliphatic, cycloaliphatic or aromatic dicarboxylic acids and diols or hydroxycarboxylic acids.

The aliphatic dicarboxylic acids may contain 2 to 40 carbon atoms, the cycloaliphatic dicarboxylic acids may contain 6 to 10 carbon atoms, the aromatic dicarboxylic acids may contain 8 to 14 carbon atoms, the aliphatic hydroxycarboxylic acids may contain 2 to 12 carbon atoms, and the aromatic as well as the cycloaliphatic hydroxycarboxylic acids may contain 7 to 14 carbon atoms.

The aliphatic diols may contain 2 to 12 carbon atoms, the cycloaliphatic diols may contain 5 to 8 carbon atoms, and the aromatic diols can contain 6 to 16 carbon atoms.

Aromatic diols are those, wherein two hydroxyl groups are bound to one or different aromatic hydrocarbon radicals.

It is also possible that the polyesters are branched with small amounts, e.g. from 0.1 to 3 mol %, based on the dicarboxylic acids present, of more than difunctional monomers (e.g. pentaerythritol, trimellitic acid, 1,3,5-tri (hydroxyphenyl)benzene, 2,4-dihydroxybenzoic acid or 2-(4-hydroxyphenyl)-2-(2,4-dihydroxyphenyl)propane).

In polyesters consisting of at least 2 monomers, these can be randomly distributed or may be block copolymers.

Suitable dicarboxylic acids are linear and branched saturated aliphatic dicarboxylic acids, aromatic dicarboxylic acids, and cycloaliphatic dicarboxylic acids.

Aliphatic dicarboxylic acids are suitably those containing 2 to 40 carbon atoms, typically oxalic acid, malonic acid, dimethylmalonic acid, succinic acid, pimelic acid, adipic acid, trimethyladipic acid, sebacic acid, azelaic acid and dimeric acids (dimerisation products of unsaturated aliphatic carboxylic acids such as oleic acid), alkylated malonic and succinic acids such as octadecylsuccinic acid.

Suitable cycloaliphatic dicarboxylic acids are: 1,3-cyclobutanedicarboxylic acid, 1,3-cyclopentanedicarboxylic acid, 1,3- and 1,4-cyclohexanedicarboxylic acid, 1,3- and 1,4-(dicarboxylmethyl)cyclohexane, 4,4'-dicyclohexyldicarboxylic acid.

Suitable aromatic dicarboxylic acids are: Preferably terephthalic acid, isophthalic acid, o-phthalic acid as well as 1,3-, 1,4-, 2,6- or 2,7-naphthalenedicarboxylic acid, 4,4'-diphenyldicarboxylic acid, 4,4'-diphenylsulfonedicarboxylic acid, 4,4'-benzophenonedicarboxylic acid, 1,1,3-trimethyl-5-carboxyl-3-(p-carboxylphenyl)indane, 4,4'-diphenyl ether dicarboxylic acid, bis-p(carboxylphenyl)methane, or bis-p (carboxylphenyl)ethane.

The aromatic dicarboxylic acids are preferred and of these, in particular, terephthalic acid, isophthalic acid and 2,6-naphthalenedicarboxylic acid.

Further suitable dicarboxylic acids are those containing —CO—NH groups; they are disclosed in DE-A-2 414 349. Dicarboxylic acids containing N-heterocyclic rings are also suitable, for example those which are derived from carboxylalkylated, carboxylphenylated or carboxybenzylated monoamine-s-triazinedicarboxylic acids (see DE-A-2 121 184 and 2 533 675), mono- or bishydantoins, benzimidazoles which may be halogenated, or parabanic acid. The carboxyalkyl groups can in this case contain 3 to 20 carbon atoms.

Suitable aliphatic diols are the linear and branched aliphatic glycols, preferably those of 2 to 12, preferably 2 to 6, carbon atoms in the molecule, for example: ethylene glycol, 1,2- and 1,3-propylene glycol, 1,2-, 1,3-, 2,3- or 1,4-butanediol, pentyl glycol, neopentyl glycol, 1,6-hexanediol, 1,12-dodecanediol. A suitable cycloaliphatic diol is, for example, 1,4-dihydroxycyclohexane. Further suitable aliphatic diols are typically 1,4-bis(hydroxymethyl) cyclohexane, aromatic-aliphatic diols, such as p-xylylene glycol or 2,5-dichloro-p-xylylene glycol, 2,2-(β-hydroxyethoxyphenyl)propane as well as polyoxyalkylene glycols, such as diethylene glycol, triethylene glycol, polyethylene glycol or polypropylene glycol. The alkylenediols are preferably linear and preferably contain 2 to 4 carbon atoms.

Preferred diols are the alkylenediols, 1,4-dihydroxycyclohexane and 1,4-bis(hydroxymethyl) cyclohexane. Ethylene glycol, 1,4-butanediol as well as 1,2- and 1,3-propylene glycol are particularly preferred.

Further suitable aliphatic diols are the β-hydroxyalkylated, preferably β-hydroxyethylated, bisphenols such as 2,2-bis[4'-(β-hydroxyethoxy)phenyl]propane. Further bisphenols as indicated later.

Another group of suitable aliphatic diols are the heterocyclic diols disclosed in the German specifications 1 812 003, 2 342 432, 2 342 372 and 2 453 326. Illustrative examples are: N,N'-bis(β-hydroxyethyl)-5,5-dimethylhydantoin, N,N'-bis(β-hydroxypropyl)-5,5-dimethylhydantoin, methylenebis[N-(β-hydroxyethyl)-5-methyl-5-ethylhydantoin], methylenebis[N-(β-hydroxyethyl)-5,5-dimethylhydantoin], N,N'-bis(β-hydroxyethyl)benzimidazolone, N,N'-bis(β-hydroxyethyl)-(tetrachloro)benzimidazolone, or N,N'-bis(β-hydroxyethyl)-(tetrabromo)benzimidazolone.

Suitable aromatic diols are mononuclear diphenols and, preferably, binuclear diphenols, which carry a hydroxyl group at each aromatic nucleus. Aromatic will preferably be understood as meaning aromatic hydrocarbon radicals such as phenylene or naphthylene. In addition to, for example, hydroquinone, resorcinol or 1,5-, 2,6- and 2,7-dihydroxynaphthalene, those bisphenols merit particular mention which can be illustrated by the following formulae:

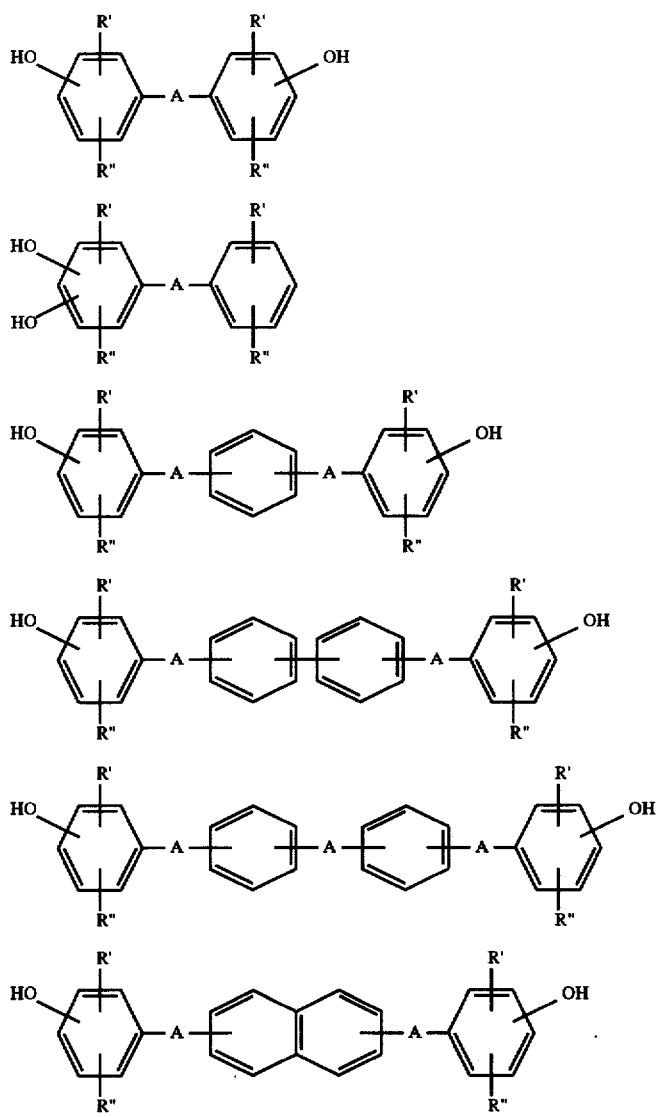

The hydroxyl groups can be in m-position, preferably in p-position. R' and R" in these formulae may be alkyl of 1 to 6 carbon atoms, halogen such as chloro or bromo and, preferably, hydrogen atoms. A can be a direct bond, or oxygen, sulfur, —SO—, —SO$_2$—, >C=O, —P(O) (C$_1$–C$_{20}$alkyl)-, unsubstituted or substituted alkylidene, cycloalkylidene or alkylene.

Typical examples of unsubstituted or substituted alkylidene are ethylidene, 1,1- or 2,2-propylidene, 2,2-butylidene, 1,1-isobutylidene, pentylidene, hexylidene, heptylidene, octylidene, dichloroethylidene, trichloroethylidene.

Typical examples of unsubstituted or substituted alkylene are methylene, ethylene, phenylmethylene, diphenylmethylene, methylphenylmethylene. Typical examples of cycloalkylidene are cyclopentylidene, cyclohexylidene, cycloheptylidene and cyclooctylidene.

Illustrative examples of bisphenols are: bis(p-hydroxyphenyl)ether or bis(p-hydroxyphenyl)thioether, bis(p-hydroxyphenyl)sulfone, bis(p-hydroxyphenyl)methane, bis(4-hydroxyphenyl)-2,2'-biphenyl, phenylhydroquinone, 1,2-bis(p-hydroxyphenyl)ethane, 1-phenyl-bis(p-hydroxyphenyl)methane, diphenyl-bis(p-hydroxyphenyl)methane, diphenyl-bis(p-hydroxyphenyl)ethane, bis(3,5-dimethyl-4-hydroxyphenyl)sulfone, bis(3,5-dimethyl-4-hydroxyphenyl)-p-diisopropylbenzene, bis(3,5-dimethyl-4-hydroxyphenyl)-m-diisopropylbenzene, 2,2-bis(3',5'-dimethyl-4'-hydroxyphenyl)propane, 1,1- or 2,2-bis(p-hydroxyphenyl)butane, 2,2-bis(p-hydroxyphenyl)hexafluoropropane, 1,1-dichloro- or 1,1,1-trichloro-2,2-bis(p-hydroxyphenyl)ethane, 1,1-bis(p-hydroxyphenyl)cyclopentane and, preferably, 2,2-bis(p-hydroxyphenyl)propane (bisphenol A) and 1,1-bis(p-hydroxyphenyl)cyclohexane (bisphenol C).

Suitable polyesters of hydroxycarboxylic acids are typically polycaprolactone, polypivalolactone or the polyesters of 4-hydroxycyclohexanecarboxylic acid or 4-hydroxybenzoic acid.

Polymers which are also suitable are those predominantly containing ester bonds, but which can also contain other bonds, e.g. polyester amides or polyester imides.

Polyesters containing aromatic dicarboxylic acids have become of the greatest importance, especially the polyalkylene terephthalates. Those novel moulding compounds are therefore preferred, wherein the polyester is composed of at least 30 mol %, preferably of at least 40 mol %, of aromatic dicarboxylic acids, and of at least 30 mol %, preferably of at least 40 mol %, of alkylenediols which preferably contain 2 to 12 carbon atoms, based on the polyester.

In this case the alkylenediol is preferably linear and contains 2 to 6 carbon atoms, typically ethylene-, tri-, tetra- or hexamethylene glycol, and the aromatic dicarboxylic acid terephthalic acid and/or isophthalic acid.

Particularly suitable polyesters are PET, PETG (glycol-modified polyethylene terephthalate) or PBT and corresponding copolymers. PET and its copolymers are particularly preferred.

Polyketones will be understood as meaning plastic materials which are prepared by polymerising carbon monoxide with unsaturated hydrocarbons, such as dislosed, inter alia, in EP-A-0 222 454 or EP-A-0 685 517.

Convenient compositions, as described above, are those wherein components (b) and (c) are present together in an amount of 0.05 to 5%, preferably of 0.1 to 5%, typically of 0.1 to 2%, based on the weight of component (a).

Also preferred are those compositions, wherein the weight ratio of the components (b):(c) is from 10:1 to 1:10, preferably from 5:1 to 1:5, typically from 4:1 to 1:2.

In addition to the components (b) and (c), the novel compositions can contain additional additives or costabilisers, such as the following:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4- hydroxybenzyl)-2,3,5,6-tetramethylbenzene, 2,4,6-tris(3,5-di-tert-butyl-4-hydroxybenzyl)phenol.

1.10. Triazine Compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenyethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-ethylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis (3,5-di-tert-butyl-4-hydroxyphenylpropionyl) trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1 supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino) propane, (o-tolyl)biguanide, bis[4-(1',3'-dimethylbutyl) phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyidiphenylamines, a mixture of mono- and dialkylated isopropyl/isohexyldiphenylamines, a mixture of mono- und dialkylated tert-butyldiphenylamines, 2,3-dihydro-3,3-dimethyl-4H-1,4-benzothiazine, phenothiazine, a mixture of mono- und dialkylated tert-butyl/tert-octylphenothiazines, a mixture of mono- und dialkylated tert-octyl-phenothiazines, N-allylphenothiazin, N,N,N',N'-tetraphenyl-1,4-diaminobut-2-ene, N,N-bis-(2,2,6,6-tetramethyl-piperid-4-yl-hexamethylenediamine, bis(2,2,6,6-tetramethylpiperid-4-yl)-sebacate, 2,2,6,6-tetramethylpiperidin-4-one, 2,2,6,6-tetramethylpiperidin-4-ol.

2. UV absorbers and light stabilisers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl) phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)

benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylene-bis-[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$-]$_2$ where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl) phenyl]benzotriazole; 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis (4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl) hexamethylenediamine and 4-tert-octylamino-2,6-dichloro-1,3,5-triazine, tris(2,2,6,6-tetramethyl-4-piperidyl) nitrilotriacetate, tetrakis-(2,2,6,6-tetramethyl-4-piperidyl)-1,2,3,4-butane-tetracarboxylate, 1,1'-(1,2-ethanediyl)-bis-(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4,5]decan-2,4-dione, bis(1-octyloxy-2,2,6,6-tetramethylpiperidyl) sebacate, bis(1-octyloxy-2,2,6,6-tetramethylpiperidyl) succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4,5]decane-2,4-dione, 3-dodecyl-1-(2,2,6,6-tetramethyl-4-piperidyl) pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis (2,2,6,6-tetramethyl-4-piperidyl)hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro [4,5]decane, a reaction product of 7,7,9,9-tetramethyl-2-cycloundecyl-1-oxa-3,8-diaza-4-oxospiro [4,5]decane und epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl) hexamethylenediamine, diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis-(4-methylphenyl)-1,3,5-triazine, 2-(2-hydroxy-4-dodecyloxyphenyl)-4,6-bis (2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy) phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl) oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol di-phosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-di-benz[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 2,2',2"-nitrilo[triethyltris(3,3',5,5'-tetra-tert-butyl-1,1'-biphenyl-2,2'-diyl)phosphite], 2-ethylhexyl(3,3', 5,5'-tetra-tert-butyl-1,1'-biphenyl-2,2'-di-yl)phosphite.

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example, dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyidithiocarbamate, dioctadecyl disulfide, pentaerythritol tetrakis(β-dodecylmercapto)propionate.

9. Polyamide stabilisers, for example, copper salts in combination with iodides and/or phosphorus compounds and salts of divalent manganese.

10. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium behenate, magnesium stearate, sodium ricinoleate and potassium palmitate, antimony pyrocatecholate or zink pyrocatecholate.

11. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).

12. Fillers and reinforcing agents, for example, calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example, plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591102 or 3-[4-(2-acetoxyethoxy)phenyl]-5,7-di-tert-butyl-benzofuran-2-one, 5,7-di-tert-butyl-3-[4-(2-stearoyloxyethoxy)phenyl] benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one.

With the exception of the benzofuranones listed under item 14, the costabilisers are added typically in concentrations of 0.01 to 10%, based on the total weight of the stabilising polyamide, polyester or polyketone.

Further preferred compositions comprise, besides the components (a), (b) and (c), further additives, preferably antioxidants, light stabilisers and/or processing stabilisers.

Particularly preferred additives are phenolic antioxidants (item 1 in the list), sterically hindered amines (item 2.6 in the list), phosphites and phosphonites (item 4 in the list) and peroxide scavengers (item 8 in the list).

Further additional additives (stabilisers) which are also particularly preferred are benzofuran-2-ones, such as those disclosed, inter alia, in U.S. Pat. No. 4,325,863, U.S. Pat. No. 4,338,244, U.S. Pat. No. 5,175,312, U.S. Pat. No. 5,216,052, U.S. Pat. No. 5,252,643, DE-A-4 316 611, DE-A-4 316 622, DE-A-4 316 876, EP-A-0 589 839 and EP-A-0 591 102.

Illustrative examples of such benzofuran-2-ones are compounds of formula

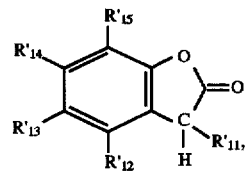

wherein
R'$_{11}$ is an unsubstituted or substituted carbocyclic or heterocyclic aromatic ring system;
R'$_{12}$ is hydrogen;
R'$_{14}$ is hydrogen, alkyl of 1 to 12 carbon atoms, cyclopentyl, cyclohexyl, or chloro;
R'$_{13}$ has the meaning of R'$_{12}$ or R'$_{14}$, or is a radical of formula $$-(CH_2)_s-\overset{O}{\overset{\|}{C}}-OR'_{16},$$

$$-(CH_2)_s-\overset{O}{\overset{\|}{C}}-N(R'_{17})_2,$$

$$-(CH_2)_s-\overset{O}{\overset{\|}{C}}-O-A-O-\overset{O}{\overset{\|}{C}}-(CH_2)_s-E,$$

$$-(CH_2)_s-\overset{O}{\overset{\|}{C}}-NR'_{18}-A-NR'_{18}-\overset{O}{\overset{\|}{C}}-(CH_2)_s-E,$$

$$-(CH_2)_s-\overset{O}{\overset{\|}{C}}-NR'_{18}-A-O-\overset{O}{\overset{\|}{C}}-(CH_2)_s-E,$$

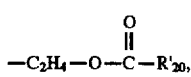

$$-CH_2-S-R'_{19},\ -CH(C_6H_5)-\overset{O}{\overset{\|}{C}}-OR'_{16}\text{ or }-D-E,$$

wherein

R'$_{16}$ is hydrogen, alkyl of 1 to 18 carbon atoms, alkyl of 2 to 18 carbon atoms which is interrupted by oxygen or sulfur, dialkylaminoalkyl having a total of 3 to 16 carbon atoms, cyclopentyl, cyclohexyl, phenyl, or phenyl which is substituted by 1 to 3 alkyl radicals having a total of at most 18 carbon atoms;

s is 0, 1 or 2;

substituents R'$_{17}$ are each independently of one another hydrogen, alkyl of 1 to 18 carbon atoms, cyclopentyl, cyclohexyl, phenyl, phenyl which is substituted by 1 or 2 alkyl radicals having a total of at most 16 carbon atoms, a radical of formula —C$_2$H$_4$OH, —C$_2$H$_4$—O—C$_t$H$_{2t+1}$ or $$-C_2H_4-O-\overset{O}{\overset{\|}{C}}-R'_{20},$$

or, together with the linking nitrogen atom, form a piperidine or morpholine radical;

t is 1 to 18;

R'$_{20}$ is hydrogen, alkyl of 1 to 22 carbon atoms, or cycloalkyl of 5 to 12 carbon atoms;

A is alkylene of 2 to 22 carbon atoms which may be interrupted by nitrogen, oxygen or sulfur;

R'$_{18}$ is hydrogen, alkyl of 1 to 18 carbon atoms, cyclopentyl, cyclohexyl, phenyl; phenyl which is substituted by 1 or 2 alkyl radicals having a total of at most 16 carbon atoms, or benzyl;

R'$_{19}$ is alkyl of 1 to 18 carbon atoms;

D is —O—, —S—, —SO—, —SO$_2$— or —C(R'$_{21}$)$_2$—; substituents R'$_{21}$ are each independently of the other hydrogen or C$_1$-C$_{16}$alkyl, the two R'$_{21}$ together containing 1 to 16 carbon atoms, or R'$_{21}$ is phenyl or a radical of formula $$-(CH_2)_s-\overset{O}{\overset{\|}{C}}-OR'_{16}\text{ or }-(CH_2)_s-\overset{O}{\overset{\|}{C}}-N(R'_{17})_2,$$

wherein s, R'$_{16}$ and R'$_{17}$ are as defined above;

E is a radical of formula

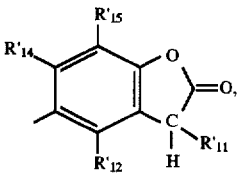

wherein R'$_{11}$, R'$_{12}$ and R'$_{14}$ are as defined above; and R'$_{15}$ is hydrogen, alkyl of 1 to 20 carbon atoms, cyclopentyl, cyclohexyl, chloro, or a radical of formula $$-CH_2-\overset{O}{\overset{\|}{C}}-OR'_{16}\text{ or }-CH_2-\overset{O}{\overset{\|}{C}}-N(R'_{17})_2,$$

wherein R'$_{16}$ and R'$_{17}$ are as defined above, or R'$_{15}$, together with R'$_{14}$, forms a tetramethylene radical.

Preferred benzofuran-2-ones are those, wherein R'$_{13}$ is hydrogen, alkyl of 1 to 12 carbon atoms, cyclopentyl, cyclohexyl, chloro or a radical of formula $$-(CH_2)_s-\overset{O}{\overset{\|}{C}}-OR'_{16},\ -(CH_2)_s-\overset{O}{\overset{\|}{C}}-N(R'_{17})_2,$$

or —D—E, wherein s, R'$_{16}$, R'$_{17}$, D and E are as defined above. R'$_{16}$ is preferably hydrogen, alkyl of 1 to 18 carbon atoms, cyclopentyl or cyclohexyl.

Preferred benzofuran-2-ones are also those, wherein R'$_{11}$ is phenyl or phenyl which is substituted by 1 or 2 alkyl radicals having a total of at most 12 carbon atoms; R'$_{12}$ is hydrogen;

R'$_{14}$ is hydrogen or alkyl of 1 to 12 carbon atoms;

R'$_{13}$ is hydrogen, alkyl of 1 to 12 carbon atoms, $$-(CH_2)_s-\overset{O}{\overset{\|}{C}}-OR'_{16},$$

$$-(CH_2)_s-\overset{O}{\overset{\|}{C}}-N(R'_{17})_2$$

or —D—E; R'$_{15}$ is hydrogen, alkyl of 1 to 20 carbon atoms, $$-CH_2-\overset{O}{\overset{\|}{C}}-OR'_{16}\text{ or }-CH_2-\overset{O}{\overset{\|}{C}}-N(R'_{17})_2,$$

or R'$_{15}$, together with R'$_{14}$, forms a tetramethylene radical, wherein s, R'$_{16}$, R'$_{17}$, D and E are as defined at the outset.

Particularly interesting benzofuran-2-ones are also those, wherein R'$_{13}$ is hydrogen, alkyl containing 1 to 12 carbon atoms or —D—E; R'$_{12}$ and R'$_{14}$ are each independently of the other hydrogen or alkyl of 1 to 4 carbon atoms; and R'$_{15}$ is alkyl of 1 to 20 carbon atoms, wherein D and E are as defined at the outset.

Of particular interest are also those benzofuran-2-ones, wherein $R'_{13}$ is alkyl of 1 to 4 carbon atoms or —D—E; $R'_{12}$ and $R'_{14}$ are hydrogen; and $R'_{15}$ is alkyl of 1 to 4 carbon atoms, cyclopentyl or cyclohexyl, D is a —$C(R'_{21})_2$— group and E is a radical of formula

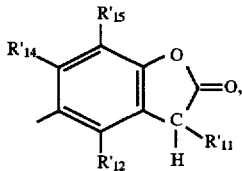

the substituents $R'_{21}$ being identical or different from each other and are each alkyl of 1 to 4 carbon atoms, and $R'_{11}$, $R'_{12}$, $R'_{14}$ and $R'_{15}$ are as defined above.

The amount of benzofuran-2-ones additionally employed can vary within wide limits. They can be present in the novel compositions typically in amounts of 0.0001 to 5 by weight, preferably of 0.001 to 2 by weight, most preferably of 0.01 to 2% by weight.

The components (b) and (c) and any further additives are incorporated into component (a) [polyamide, polyester or polyketone] by known methods, typically before or during shaping, or alternatively by applying the dissolved or dispersed components (a) and (b) to the component (a), with subsequent evaporation of the solvent, when used. The components (b) and (c) can also be added to the materials to be stabilised [component (a)] in the form of a masterbatch which contains these components in a concentration of 2.5 to 25% by weight.

The components (b) and (c) can also be added before or during polymerisation or before crosslinking.

The components (b) and (c) can be incorporated into the component (a) to be stabilised in pure form or encapsulated in waxes, oils or polymers.

Components (b) and (c) can also be sprayed onto the component (a) to be stabilised. They are able to dilute other additives (e.g. the standard additives cited above) or their melts, so that they can also be sprayed onto the component (a) to be stabilised together with these additives. Application by spraying during deactivation of the polymerisation catalysts is particularly advantageous, in which case the steam used for the deactivation may be used for spraying.

The polyamides, polyesters and polyketones stabilised in this manner can be used a wide range of forms, typically including films, fibres, filaments, moulded articles, profiles or binders for paints, adhesives or putties.

The components (b) and (c) are particularly suitable as processing stabilisers (heat stabilisers). To this end they are preferably added to component (a) before or during processing.

A preferred embodiment of this invention is therefore the use of the phosphite of formula I and at least one compound of formula II as stabilisers, preferably as processing stabilisers (heat stabilisers), for polyamides, polyesters or polyketones against oxidative, thermal or light-induced degradation.

The components (b) and (c) are distinguished by their advantageous colour behaviour, i.e. minor discoloration of the polyamides, polyesters and polyketones during processing.

This invention also relates to a process for stabilising a polyamide, polyester or polyketone against oxidative, thermal and/or light-induced degradation, which comprises incorporating therein, or applying thereto, the phosphite of formula I and at least one compound of formula II.

This invention also relates to a stabiliser mixture comprising (i) the phosphite of formula I and (ii) at least one compound of formula II.

Preferred stabiliser mixtures are also those, wherein the weight ratio of components (i):(ii) is from 10:1 to 1:10, preferably from 5:1 to 1:5, typically from 4:1 to 1:2.

The preferred compounds of formula II for use as stabilisers, the process for stabilising, and the stabiliser mixture are the same as those described for the compositions with a polyamide, polyester or polyketone.

The stabiliser mixtures of components (i) and (ii) are called LC blends (low color blends). They are distinguished by excellent storage stability, low volatility and superb free flowing properties. The LC blends cited in Table 1 are particularly preferred.

TABLE 1

| LC Blend | Component (i) | Component (ii) | Weight ratio (i):(ii) |
|---|---|---|---|
| A | Irgafos ®12[a] | Irganox ®1010[b] | 1:1 |
| B | Irgafos ®12[a] | Irganox ®1010[b] | 2:1 |
| C | Irgafos ®12[a] | Irganox ®1010[b] | 1:2 |
| D | Irgafos ®12[a] | Irganox ®1010[b] | 4:1 |
| E | Irgafos ®12[a] | Irganox ®3114[c] | 1:1 |
| F | Irgafos ®12[a] | Irganox ®1098[d] | 1:1 |
| G | Irgafos ®12[a] | Irganox ®1098[d] | 1:2 |
| H | Irgafos ®12[a] | Irganox ®1076[e] | 4:1 |
| I | Irgafos ®12[a] | Irganox ®1076[e] | 2:1 |

[a] Irgafos ®12 conforms to the compound of formula I.
[b] Irganox ®1010 conforms to the compound of formula IIc.
[c] Irganox ®3114 conforms to the compound of formula IIg.
[d] Irganox ®1098 conforms to the compound of formula IIa.
[e] Irganox ®1076 conforms to the compound of formula IIb.

The invention is further illustrated by the following Examples in which parts and percentages are by weight.

Example 1

Stabilisation of polyamide 6.

100 parts of unstabilised polyamide 6 granulate (Ultramide®B3, supplied by BASF) are powdered by cryogenic grinding and the stabilisers of Table 2 are added. The mixture is mixed with a Henschel mixer for 2 minutes. The powder so obtained is dried at 80° C. for 6 hours, extruded in an extruder (type Berstorff) at a maximum of 240° C. and then granulated. The granulate so obtained is moulded on an injection moulding machine at a maximum of 240° C. to dumbbells 1.0 mm thick and to plates 2.0 mm thick.

The dumbbells are aged in a circulating air oven at 140° C. The continuation of the ageing is observed at intervals of 1–3 days by determining the force-elongation diagrams. The end point is defined as the time after which the residual strain has fallen to 50% of its starting value. The greater the time, the better the stabilisation. The results are summarised in Table 2.

The plates are aged in a circulating air oven at 80° C. over 1500 hours. The yellowness index (YI) of these plates is determined in accordance with ASTM D 1925-70. Low YI values denote minor discoloration, high YI values denote strong discoloration of the samples. The less discoloration, the more effective the stabiliser mixture. The results are summarised in Table 2.

TABLE 2

| Example | Stabiliser | Time in hours to 50% residual strain at 140° C. (dumbbells) | Yellowness Index after 1500 hours at 80° C. (plates) |
|---|---|---|---|
| 1a | — | 12 | 51.5 |
| 1b | 0.2% Irgafos ®168[a) 0.2% Irganox ®1098[b) | 282 | 50.0 |
| 1c | 0.2% Irgafos ®12[c) 0.2% Irganox ®1098[b) | 369 | 42.0 |

[a)]Irgafos ®168 (Ciba-Geigy) is tris(2,4-di-tert-butylphenyl)phosphite.
[b)]Irganox ®1098 (Ciba-Geigy) is N,N'-bis(3,5-di-tert-butyl-4-hydroxyphenylpropionyl)hexa-methylenediamine (compound of formula IIa).

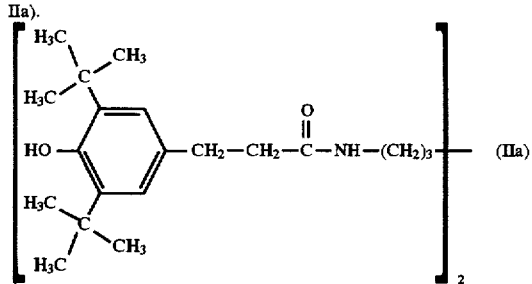

[c)]Irgafos ®12 (Ciba-Geigy) is 2,2',2"-nitrilo[triethyl-tris(3,3'5,5'-tetra-tert-butyl-1,1'-biphenyl-2,2'-diyl)phosphite]; Chemical Abstract "Registry" number: 80410-33-9 and is the compound of formula I.

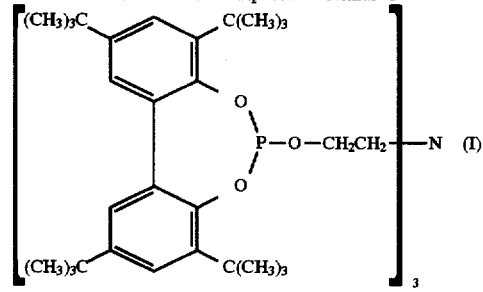

The results of Table 2 show that the novel stabiliser mixture (Example 1c) is markedly more effective than the known stabiliser mixture (Example 1b).

What is claimed is:

1. A composition, comprising
a) a polyamide, polyester or polyketone which is subject to oxidative, thermal or light-induced degradation,
b) the phosphite of formula I

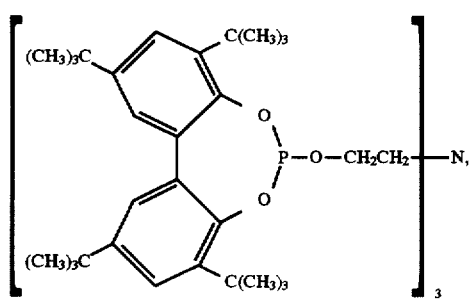

and
c) a compound of formula II

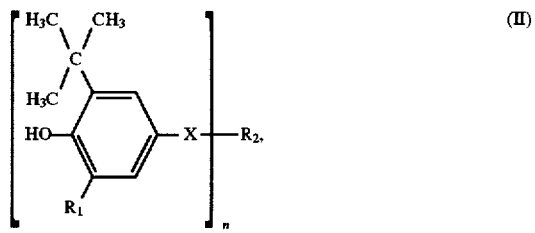

wherein
$R_1$ is tert-butyl
n is 2,
X is

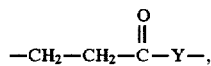

$$-CH_2-CH_2-\overset{O}{\underset{\|}{C}}-Y-,$$

Y is —NH—; and,
X is

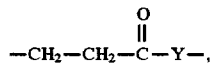

$$-CH_2-CH_2-\overset{O}{\underset{\|}{C}}-Y-,$$

wherein Y is bound to $R_2$, and
$R_2$ is hexamethylene.

2. A composition according to claim 1, wherein the polyamide is a polyamide 6, polyamide 6.6, polyamide 11 or polyamide 12, or a copolymer thereof.

3. A composition according to claim 1, wherein the polyester is a PET, PETG or PBT, or a copolymer thereof.

4. A composition according to claim 1, wherein components (b) and (c) are present together in an amount of 0.05 to 5%, based on the weight of component (a).

5. A composition according to claim 1, wherein the weight ratio of components (b):(c) is from 10:1 to 1:10.

6. A composition according to claim 1, additionally comprising further additives besides the components (b) and (c).

7. A composition according to claim 6, comprising as additional additives phenolic anti-oxidants, light stabilisers and/or processing stabilisers.

8. A composition according to claim 6, comprising as additional additive at least one compound of the benzofuran-2-one type.

9. A process for stabilising a polyamide, polyester or polyketone against oxidative, thermal and/or light-induced degradation, which comprises incorporating therein, or applying thereto, the phosphite of formula I and at least one compound of formula II as claimed in claim 1.

10. A stabiliser mixture comprising (i) the phosphite of formula I and (ii) at least one compound of formula II as claimed in claim 1.

11. A stabiliser mixture according to claim 10, wherein the weight ratio of the components (i):(ii) is from 10:1 to 1:10.

* * * * *

UNITED STATES PATENT AND TRADEMARK OFFICE
CERTIFICATE OF CORRECTION

PATENT NO. : 5,763,512
DATED : JUNE 9, 1998
INVENTOR(S) : ANDRÉ SCHMITTER

It is certified that error appears in the above-identified patent and that said Letters Patent is hereby corrected as shown below:

Title page, left column, insert section -- [30] Foreign Application Priority Data, March 29, 1996 [CH] Switzerland......................820/96 --

Signed and Sealed this

Twentieth Day of April, 1999

Attest:

Q. TODD DICKINSON

*Attesting Officer*    Acting Commissioner of Patents and Trademarks